(12) United States Patent
Shimamura et al.

(10) Patent No.: US 10,113,080 B2
(45) Date of Patent: Oct. 30, 2018

(54) METHOD FOR MANUFACTURING AQUEOUS BLACK PIGMENT DISPERSION

(71) Applicant: DIC CORPORATION, Tokyo (JP)

(72) Inventors: Yoshinosuke Shimamura, Saitama (JP); Mariko Toshimitsu, Saitama (JP); Takaaki Nabe, Saitama (JP); Yoshihiro Sato, Saitama (JP)

(73) Assignee: DIC CORPORATION (TOKYO), Tokyo (JP)

( * ) Notice: Subject to any disclaimer, the term of this patent is extended or adjusted under 35 U.S.C. 154(b) by 5 days.

(21) Appl. No.: 15/113,097

(22) PCT Filed: Jan. 22, 2015

(86) PCT No.: PCT/JP2015/051643
§ 371 (c)(1),
(2) Date: Jul. 21, 2016

(87) PCT Pub. No.: WO2015/115295
PCT Pub. Date: Aug. 6, 2015

(65) Prior Publication Data
US 2017/0002224 A1 Jan. 5, 2017

(30) Foreign Application Priority Data

Jan. 29, 2014 (JP) ................. 2014-014322
Jan. 29, 2014 (JP) ................. 2014-014323

(51) Int. Cl.
| | | |
|---|---|---|
| C09D 17/00 | (2006.01) | |
| C09C 1/48 | (2006.01) | |
| C09C 3/08 | (2006.01) | |
| C09C 3/10 | (2006.01) | |
| C09D 11/324 | (2014.01) | |
| C09C 1/56 | (2006.01) | |
| C09D 11/10 | (2014.01) | |
| C09D 11/037 | (2014.01) | |
| C09D 11/104 | (2014.01) | |
| C09D 11/326 | (2014.01) | |
| C09D 125/14 | (2006.01) | |
| C09D 175/04 | (2006.01) | |
| C08K 3/04 | (2006.01) | |

(52) U.S. Cl.
CPC ............. *C09D 17/005* (2013.01); *C09C 1/48* (2013.01); *C09C 1/56* (2013.01); *C09C 1/565* (2013.01); *C09C 3/08* (2013.01); *C09C 3/10* (2013.01); *C09D 11/037* (2013.01); *C09D 11/10* (2013.01); *C09D 11/104* (2013.01); *C09D 11/324* (2013.01); *C09D 11/326* (2013.01); *C09D 17/00* (2013.01); *C09D 17/001* (2013.01); *C09D 125/14* (2013.01); *C09D 175/04* (2013.01); *C01P 2004/62* (2013.01); *C01P 2004/64* (2013.01); *C08K 3/04* (2013.01)

(58) Field of Classification Search
CPC ..... C09D 11/037; C09D 11/10; C09D 11/104; C09D 11/324; C09D 11/326; C09D 17/00; C09D 17/001; C09D 17/005; C09D 125/14; C09D 175/04
USPC .................................................. 524/495, 496
See application file for complete search history.

(56) References Cited

U.S. PATENT DOCUMENTS

| | | | |
|---|---|---|---|
| 6,123,759 | A | 9/2000 | Mise et al. |
| 6,153,001 | A | 11/2000 | Suzuki et al. |
| 6,261,353 | B1 | 7/2001 | Doi et al. |
| 2004/0254264 | A1 | 12/2004 | Suzuki et al. |
| 2006/0203055 | A1 | 9/2006 | Doi |
| 2012/0256984 | A1 | 10/2012 | Okamura et al. |

FOREIGN PATENT DOCUMENTS

| | | |
|---|---|---|
| JP | 9-194775 A | 7/1997 |
| JP | 10-60331 A | 3/1998 |
| JP | 10-324818 A | 12/1998 |
| JP | 11-181341 A | 7/1999 |
| JP | 11-349873 A | 12/1999 |
| JP | 2004-256798 A | 9/2004 |
| JP | 2004-285171 A | 10/2004 |
| JP | 2005-1217 A | 1/2005 |
| JP | 2006-248049 A | 9/2006 |
| JP | 2007-63493 A | 3/2007 |
| JP | 2009-67831 A | 4/2009 |
| JP | 2009-144060 A | 7/2009 |
| JP | 2011-144354 A | 7/2011 |

OTHER PUBLICATIONS

JP 2011-144354 machine translation Original document date (2011).*
JP 2007-063493 machine translation Original document date (2007).*
International Search Report dated Apr. 28, 2015, issued in counterpart international application No. PCT/JP2015/051643(2 pages).

* cited by examiner

*Primary Examiner* — Edward J Cain
(74) *Attorney, Agent, or Firm* — Westerman, Hattori, Daniels & Adrian, LLP

(57) ABSTRACT

A method for manufacturing an aqueous black pigment dispersion, including the steps of subjecting a mixture containing carbon black and an aqueous medium to media-less dispersion and adding a resin having anionic groups and a basic compound after the dispersion, wherein the carbon black has a carboxylic acid group on the surface such that the value produced by dividing the amount of carboxylic acid group present on the surface by BET value is 0.8 to 5.5 ($\mu mol/m^2$) and the resin having anionic groups is an urethane resin that satisfies (weight average molecular weight/acid value)<1,400 or a styrene acrylic resin that satisfies (weight average molecular weight/acid value)<120.

4 Claims, No Drawings

METHOD FOR MANUFACTURING AQUEOUS BLACK PIGMENT DISPERSION

TECHNICAL FIELD

The present invention relates to a method for manufacturing an aqueous black pigment, dispersion that uses carbon black as a black pigment.

BACKGROUND ART

The range of uses, such as homes, offices, photographs and the outdoors, for ink-jet recording systems tends to increase and importance has been placed on the weather (light) resistance and the storage property of printings. To date, dyes have been in dominant positions as colorants for ink-jet recording but have many problems in the light resistance. Along with that, an ink-jet recording aqueous ink exhibiting excellent light resistance has been developed.

The ink used for the ink-jet recording system is ejected from a nozzle and, therefore, is required to have both good quality intrinsic to the ink and good print quality. The intrinsic quality includes that the viscosity is low, precipitation or coagulation due to no use for a long time does not occur, i.e. good storage stability is exhibited, and plugging does not occur in an end portion, and an ink flow passage of an ink-jet printer head.

In order to obtain the ink quality such that the viscosity is low, good storage stability is exhibited, and plugging does not occur, in general, an ink, in which a pigment is stably dispersed in water or an aqueous medium by a surfactant, a high-molecular-weight dispersing agent, or the like so as to minimize the average diameter and the pigment concentration is usually adjusted to 10% or less, is used.

Among them, an ink-jet recording aqueous black ink that uses a black pigment, e.g., carbon black, is expected to substitute for electrophotography in homes and offices. However, as described above, the ink in the ink-jet recording system has problems that the optical density (also referred to as OD value, image density, or coloring density) at the time of printing is low because printing is performed in the state, in which a liquid has a pigment concentration much lower than the pigment concentration of the toner, and in addition, the ink permeates the paper easily and a high optical density is not obtained easily in the case where the medium is plain paper.

On the other hand, in general, the ink is prepared by diluting a composition, which is called, a pigment paste or pigment dispersion, having a high pigment concentration with water or an aqueous medium. Therefore, investigations on the optical density were performed with respect to the ink having a low pigment concentration and, in addition, the pigment dispersion itself having a high pigment concentration.

For example, PTL 1 discloses an aqueous black pigment dispersion containing carbon black having [1] a primary particle diameter of 20 to 30 (nm), [2] a specific surface area of 100 to 150 ($m^2$/g), and [3] DBP oil absorption of 40 to 120 ($cm^3$/100 g) and a styrene-acrylic copolymer, in which [a] a polymerization unit of a benzyl (meth)acrylate-based monomer is contained, [b] the total amount of styrene-based monomer and benzyl (meth)acrylate-based monomer is 45 to 80 percent by mole, [c] the number of moles of styrene-based monomer to the total number of moles of styrene-based monomer and benzyl (meth)acrylate-based monomer is 65% to 95%, and [d] a styrene-acrylic copolymer having an acid value of 110 to 220 (mgKOH/g) is contained, as a pigment dispersion for a ink-jet recording aqueous pigment ink, which provides a high coloring density (OD value) on the plain paper.

Also, PTL 1 discloses that there is no particular limitation regarding the dispersing method, various known dispersing machines can be used, and media agitation type dispersing machines are preferable. In the example, dispersion is performed by a dispersing apparatus (SC Mill Model SC 100/32 produced by Mitsui Mining Co., Ltd.) filled with zirconia beads.

PTL 1 discloses that in order to obtain a high OD value, specific carbon black having predetermined particle diameter, specific surface area, DBP oil absorption, and the like is preferable. However, preferable surface properties are not indicated and there is no description on, for example, a method for adding the same resin having anionic groups for maintaining good storage stability.

CITATION LIST

Patent Literature

PTL 1: Japanese Unexamined Patent Application Publication No. 2009-144060
PTL 2: Japanese Unexamined Patent Application Publication No. 10-60331
PTL 3: Japanese Unexamined Patent Application Publication No. 2004-285171
PTL 4: Japanese Unexamined Patent Application Publication No. 2004-256798

SUMMARY OF INVENTION

Technical Problem

The present invention was Made in consideration of the above-described circumstances and it is an object to provide a method for manufacturing an aqueous black pigment dispersion, which realizes a high optical density while maintaining high dispersion stability of carbon black.

Solution to Problem

The present inventors found that an aqueous black pigment dispersion obtained by performing a step of dispersing specific acidic carbon black serving as the carbon black into an aqueous medium through media-less dispersion, e.g., an ultrasonic dispersion method, and thereafter, performing a step of adding a resin having anionic groups, in which there was a specific relationship between the weight average molecular weight and the acid value, realized a high optical density while maintaining good storage stability.

The method, in which the pigment is dispersed by the ultrasonic dispersion method, is known (for example, refer to PTLs 2, 3, and 4). As described in PTLs 2 to 4, in common dispersion methods, an ultrasonic wave is applied or a dispersing machine is operated under the state in which the pigment, an organic high-molecular-weight compound having anionic groups and serving as a dispersion resin, and a dispersion medium are present together.

The present inventors placed much focus on the characteristics and the timing of addition of a dispersion resin and found that a high optical density was able to be realized while maintaining high dispersion stability of carbon black by adding a resin having specific characteristics after dispersion rather than before dispersion.

That is, the present invention provides a method for manufacturing an aqueous black pigment dispersion, including the steps of subjecting a mixture containing carbon black and an aqueous medium to media-less dispersion, and adding a resin having anionic groups and a basic compound after the dispersion, wherein the carbon black has a carboxylic acid group on the surface such that the value produced by dividing the amount of carboxylic acid group present on the surface by BET value is 0.8 to 5.5 ($\mu mol/m^2$), and the resin having anionic groups is an urethane resin that satisfies (weight average molecular weight/acid value)<1,400 or a styrene acrylic resin that satisfies (weight average molecular weight/acid value)<120.

Advantageous Effects of Invention

According to the present invention, an aqueous black pigment dispersion, which realizes a high optical density and high storage stability, can be obtained by using carbon black.

DESCRIPTION OF EMBODIMENTS (Carbon Black)
Carbon black used as a black pigment in the present invention is preferably acidic carbon black because a high OD value is obtained and dispersion is easy. Most of all, carbon black having carboxylic acid groups is preferable. For example, MA series and the like produced by MITSUBISHI CHEMICAL CORPORATION can be used.

Examples of specific characteristics of the carbon black include that the value (amount of carboxylic acid/BET value) produced by dividing the amount of carboxylic acid group of the carbon black having carboxylic acid groups by BET value (specific surface area) is 0.8 to 5.5 ($\mu mol/m^2$). If the value is less than 0.8 $\mu mol/m^2$, the hydrophilicity of the carbon black having carboxylic acid groups may become insufficient, and in order to disperse into water, a large amount of water-soluble resin component may be required. Consequently, a high optical density is not obtained in some cases because the surface tension of a paste is reduced or permeability into the paper is enhanced. Conversely, if the value is more than 5.5 $\mu mol/m^2$, permeation of carbon black itself between cellulose fibers of the paper is enhanced and the optical density may be reduced. In order to obtain a higher optical density, it is more preferable that the value of (amount of carboxylic acid/BET value) be 0.8 to 5.0 ($\mu mol/m^2$).

In this regard, known carbon black can also foe used without specific limitations by being subjected to a surface oxidation treatment. Examples thereof include #2600 series, #2300 series, #1000 series, #900 series, and MA series produced by MITSUBISHI CHEMICAL CORPORATION, COLOR-BLACK series, SPESIAL-BLACK series, PRINTEX series, HIBLACK series, NEROX series, and NIPex series produced by Orion Engineered Carbon Blacks, SUNBLACK series, #70 series, AND #80 series produced by ASAHI CARBON BLACK CO., LTD., and TOKA BLACK #7000 series and #8000 series produced by TOKAI CARBON BLACK CO., LTD.

In the case where these carbon products are used as well, it is preferable that the value (amount of carboxylic acid/BET value) produced by dividing the amount of carboxylic acid group of the carbon black by BET value (specific surface area) be 0. to 5.5 ($\mu mol/m^2$) by using known oxidation treatment methods.

(Aqueous Medium)
In the present invention, a water-soluble solvent and/or an aqueous medium, e.g., water, is used as the solvent for the aqueous black pigment dispersion. Among them, water may be used alone or a mixed solvent composed of water and a water-soluble solvent may be used. Examples of water-soluble solvents include ketones, e.g., acetone, methyl ethyl ketone, methyl butyl ketone, and methyl isobutyl ketone; alcohols, e.g., methanol, ethanol, 2-propanol, 2-methyl-1-propanol, 1-butanol, and 2-methoxyethanol; ethers, e.g., tetrahydrofuran, 1,4-dioxane, and 1,2-dimethoxyethane; and amides, e.g., dimethylformamide and N-methylpyrrolidone. Most of all, it is preferable that compounds selected from the group consisting of ketones having a carbon number of 3 to 6 and alcohols having a carbon number of 1 to 5 be used.

In addition, water-soluble organic solvents, which are dissolved into aqueous media, can be used. Examples thereof include glycols, e.g., ethylene glycol, diethylene glycol, triethylene glycol, tetraethylene glycol, propylene glycol, polyethylene glycol, and polypropylene glycol; diols, e.g., butane diol, pentane diol, hexane-diol, and diols belonging, to the same group thereof; glycol esters, e.g., propylene glycol laurate, glycol ethers, e.g., each ether of diethylene glycol monoethyl, diethylene glycol monobutyl, and diethylene glycol monohexyl, propylene glycol ether, dipropylene glycol ether, and cellosolve containing triethylene glycol ether; alcohols, e.g., methanol, ethanol, isopropyl alcohol, 1-propanol, 2-propanol, 1-butanol, 2-butanol, butyl alcohol, pentyl alcohol, and alcohols belonging to the same group thereof; sulfolane; lactones, e.g., γ-butyrolactone; lactams, e.g., N-(2-hydroxyethyl)pyrrolidone; glycerin and derivatives thereof, and other various solvents, e.g., polyoxyethylene benzyl alcohol ether, known as water-soluble organic solvents. These water-soluble organic solvents can be used alone or in combination.

Among them, polyhydric alcohols, e.g., glycols and diols, which have high boiling points, low volatility, and high surface tension, are preferable. In particular, glycols, e.g., diethylene glycol and triethylene glycol, are preferable.

(Method for Manufacturing Aqueous Black Pigment Dispersion)
A method for manufacturing an aqueous black pigment dispersion, according to the present invention, includes the steps of subjecting a mixture containing carbon black and an aqueous medium to media-less dispersion and adding any one of an urethane resin that has anionic groups and satisfies (weight average molecular weight/acid value)<1,400 or a styrene acrylic resin that has anionic groups and satisfies (weight average molecular weight/acid value)<120 and a basic compound after the dispersion.

As described above, it is desirable that the amount of use of the resin having anionic groups be minimized or the resin be not added if possible. However, in order to maintain the stability of carbon black in the aqueous black pigment dispersion, addition of the resin having anionic groups is required in many cases. In that case, the stability of the aqueous black pigment dispersion can be more enhanced by performing the addition after the media-less dispersion is completed, as in the present invention.

(Media-less Dispersion)
Specific examples of media-less dispersion according to the present invention include an ultrasonic dispersion method and dispersion methods by using a high-speed disk impeller, a colloid mill, a roll mill, a high-pressure homogenizer, Nanomizer, Altimizer, and the like. In consideration of the productivity, prevention of the surface of carbon black from being damaged, and the like, the ultrasonic dispersion method is preferable. The present invention will be described in detail with reference to an example that uses the ultrasonic dispersion method.

It is preferable that the carbon black and the aqueous medium be mixed and agitated before the ultrasonic dispersion in order to enhance the fluidity or prevent settling of the carbon black but this is not indispensable. There is no particular limitation regarding a mixing and agitation apparatus.

Meanwhile, the viscosity at this time is preferably within the range of 0.1 to 100 mPa·s from the viewpoint of the need for fluidity, and most preferably within the range of 0.5 to 10 mPa·s. Also, the pigment concentration at this time is preferably 1 to 30 percent by mass, and most preferably 5 to 20 percent by mass.

There is no particular limitation regarding the condition of the ultrasonic irradiation. Preferably, the output is 200 to 3,000 W and the frequency is 15 to 40 kHz, and further preferably, the output can be 500 to 2,000 W and the frequency can be 15 to 25 kHz.

Setting of the output in the above-described range is very preferable because of the following reasons, for example. The efficiency of cavitation increases and, thereby, the efficiency in the pigment dispersion step can increase, coarse particles can foe crashed, and coarse particles do not remain in the aqueous black pigment dispersion easily. As a result, the chroma (feel) of a color coating film obtained from the aqueous black pigment dispersion itself is improved so as to realize smooth election (good ejection stability), where an ink-jet recording aqueous ink serving as an aqueous pigment recording liquid, described later, is prepared from the aqueous black pigment dispersion, degradation of the quality of products due to settling of particles and the like is prevented, and erosion (corrosion) of an oscillation rod is remarkably reduced so as to reduce the equipment maintenance cost.

On the other hand, setting of the frequency in the above-described range can cause cavitation smoothly and, thereby, the efficiency in the pigment dispersion step can increase, coarse particles can foe crashed, and coarse particles do not easily remain in the aqueous black pigment dispersion.

The time for performing the ultrasonic irradiation only has to be a time necessary for substantially dispersing the carbon black, and it is appropriate that the amount of application, of electric power relative to the mass of carbon black contained in the dispersion liquid is 0.4 to 2.0 W/g.

The ultrasonic treatment may be performed for a time longer than the above-described time or the treatment may be finished in a time shorter than the above-described time. However, if the amount of application of electric power-relative to the weight of carbon black contained in the dispersion liquid is less than 0.4 W/g, an increase in the particle diameter, an increase in the viscosity, degradation of the image definition, and the like occur easily because of insufficient dispersion. Meanwhile, if the amount of application of electric power is more than 2.0 W/g, the performance is enhanced so as to increase the amount of electric power that is converted to heat rather than contribute to dispersion. Consequently, degradation of the dispersion efficiency relative to the applied electric power and, in addition, degradation of the temporal productivity may occur.

After the aqueous black pigment dispersion is subjected to ultrasonic irradiation, dispersion can be further performed, if necessary. Also, dispersion and ultrasonic irradiation, can be performed repeatedly.

There is no particular limitation regarding a dispersion apparatus usable in the dispersion step, and known apparatuses of various systems can be used. Examples thereof include media dispersion, e.g., sand mills, beads mills, pebble mills, ball mills, pearl mills, basket mills, attritors, DYNO-MILLs, bore mills, VISCO MILLs, motor mills, SC mills, DRAIS MILLs, and paint conditioners, and media-less dispersing machines, e.g., high-speed disk impellers, colloid mills, high-pressure homogenizers, NANOMIZERs, and Altimizers. However, as described above, excessive dispersion damages the surface of the carbon black and, therefore, it is preferable that the dispersion be performed only in unavoidable cases.

There is no particular limitation regarding the temperature of the aqueous black pigment dispersion to be subjected to the ultrasonic irradiation. It is preferable that ultrasonic irradiation is performed while the temperature of the aqueous black pigment dispersion is controlled to higher than freezing point and lower than 70° C. If the temperature is freezing point or lower, ultrasonic irradiation becomes impossible, and if the temperature is 70° C. or higher, vaporization of water occurs and unplanned factors, e.g., an increase in pigment concentration, are generated.

Known cooling means can be very commonly used for the aqueous black pigment dispersion and examples thereof include ice cooling, wind cooling, and water cooling. Specific examples of the cooling methods include a method in which a coolant is passed through a jacket of a container holding an aqueous pigment paste, a method in which a container holding an aqueous pigment paste is dipped into a coolant, a method in which a gas stream is blown, and a method in which cooling is performed on the basis of evaporation heat by using a coolant, e.g., water, and a wind.

For example, a method, in which a cooling water that has been cooled to higher than 0° C. and 20° C. or lower, and preferably higher than 0° C. and 10° C. or lower in advance is used as a coolant, is one of desirable methods because there is economy relatively and an excellent cooling efficiency is exhibited. In this case, the cooling water is circulated by a circulator and, at the same time, cooling can be performed by a cooler. At this time, it is very desirable to lower a freezing temperature by adding ethylene glycol, diethylene glycol, or the like to the cooling water or cause depression of freezing point by adding sodium chloride or the like. As a result, even when a sufficient cooling effect is not obtained by the cooling water at higher than 0° C., the temperature of the cooling water can be made 0° C. or lower, and it becomes possible to perform ultrasonic irradiation while the aqueous pigment paste is kept at a temperature on the lower side in the above-described temperature range. In the case where the wind cooling is performed, it is preferable to use a cold wind cooled in advance rather than simple blowing of a wind at an environmental temperature.

It is desirable that the number of apparatuses used for the above-described ultrasonic irradiation be minimized from the viewpoint of cost. The treatment can be performed by connecting a minimal number of apparatuses in series or in parallel, as necessary.

In this regard, the end point of the ultrasonic irradiation is determined by measuring the particle diameters of the pigment particles or the above-described composite particles with a fineness gauge or a commercially available particle size analyzer or may be determined on the basis of measurements of properties, e.g., the viscosity, the contact angle, luminous intensity of reflected light of coating films prepared by various methods, the color, and the like. Alternatively, determination may be performed on the basis of direct observation by using a microscope and the like.

An aqueous black pigment dispersion can be obtained by adding a resin aqueous solution, which is produced by mixing a resin having anionic groups, a basic compound, and water in advance and performing heating, as necessary, to the above-described dispersion material subjected to the media-less dispersion. Addition of the aqueous solution of the resin having anionic groups can exert effects of securing dispersion stability, enhancing adhesion to media, enhancing rubfastness, and the like. In this regard, it is important that the timing of addition is after finishing of dispersion. Although the specific reasons are not certain, it is considered that in the case where the above-described aqueous solution of the resin having anionic groups is added after the dispersion, the resin having anionic groups is uniformly arranged in the aqueous black pigment dispersion and, thereby, a steric hindrance effect is exerted sufficiently so as to prevent approach and coagulation of carbon black particles and maintain the stability.

In particular, in the case where acidic carbon black is used, if the aqueous solution of the resin having anionic groups is added before dispersion, unexpected cross-linking or the like of the resin itself, which has anionic groups, occurs due to an acid derived from the acidic carbon black and an increase in molecular weight, precipitation, or the like may occur. Consequently, the dispersibility and the storage stability of the aqueous black pigment dispersion may be adversely affected. For such reasons, it is effective that the acidic carbon black is dispersed into the aqueous medium in advance and, thereafter, the above-described resin aqueous solution is added.

In this regard, when the resin aqueous solution is added, it is preferable that the pH of the dispersion material subjected to the media dispersion be made alkaline because the stability of the resulting aqueous black pigment dispersion can foe maintained. At this time, an basic compound used for making the pH alkaline may be added to the dispersion material at any timing, and may be added during the media-less dispersion or after the dispersion, for example.

There is no particular limitation regarding the amount of addition of the resin having anionic groups. However, if the amount is excessive, harmful effects, e.g., an increase in viscosity and quick drying, may be exerted. Also, the surface tension decreases. Therefore, in the case where an absorbing material, e.g., paper, is printed, the optical density of printings may decrease. Consequently, the proportion of resin denoted as "mass of resin having anionic group/mass of carbon black" is preferably 0.05 to 0.50 and further preferably 0.10 to 0.40.

(Resin having Anionic Group)

The resin having anionic groups according to the present invention is an urethane resin that satisfies (weight average molecular weight/acid value)<1,400 or a styrene acrylic resin that satisfies (weight average molecular weight/acid value)<120.

As described above, unexpected cross-linking or the like of the resin itself, which has anionic groups, may occur due to an acid derived from the acidic carbon black and an increase in molecular weight, precipitation, or the like may occur. The weight average molecular weight carried by a unit value of the acid value is represented by "weight average molecular weight/acid value". Even in the case where the above-described phenomenon occurs, it is considered that when the value of "weight average molecular weight/acid value" is small, the degree of influence on an increase in dispersed particle diameter and an increase in viscosity is low. An urethane resin that satisfies (weight average molecular weight/acid value)<1,400 or a styrene acrylic resin that satisfies (weight average molecular weight/ acid value)<120 is preferable. The reason for this is considered, to be the above-described phenomenon.

Examples of the resin, having anionic groups according to the present invention include organic high-molecular-weight compounds having carboxyl groups, sulfonic acid groups, or phosphoric acid groups. Examples of such an organic high-molecular-weight compound having anionic groups include polyvinyl resins having anionic groups, polyester resins having anionic groups, amino resins having anionic groups, acrylic copolymers having anionic groups, epoxy resins having anionic groups, polyurethane resins having anionic groups, polyether resins having anionic groups, polyamide resins having anionic groups, unsaturated polyester resins having anionic groups, phenol resins having anionic groups, silicone resins having anionic groups, and fluorine-based organic high-molecular-weight compounds having anionic groups. Most of all, acrylic copolymers and polyurethane resins are preferable because raw materials are available in abundance, the design is easy, and an excellent pigment dispersion function is performed.

Specifically, examples of polyurethane resins include urethane resins produced by reacting polyols having anionic groups, e.g., carboxy groups or sulfonic acid groups, polyisocyanates and, as necessary, general-purpose polyols having no anionic group and chain elongation agents. Examples of polyols having carboxy groups used in the present invention include esters produced by a reaction between polyhydric alcohols and polybasic acid anhydrides and dihydroxyalkanoic acids, e.g., 2,2-dimethylol lactic acid, 2,2-dimethylol propionic acid, 2,2-dimethylol butanoic acid, and 2,2-dimethylol valeric acid. Preferable compounds are 2,2-dimethylol propionic acid and 2,2-dimethylol butanoic acid. Most of all, dimethylol propionic acid or dimethylol butanoic acid is easily available and, therefore, is preferable.

Also, examples of polyols having sulfonic acid groups include polyester polyols obtained by reacting dicarboxylic acids, e.g., 5-sulfoisophthalic acid, sulfoterephthalic acid, 4-sulfophthalic acid, and 5[4-sulfophenoxy]isophthalic acid, or salts thereof and the above-described low-molecular-weight polyols.

Examples of diisocyanates used in the present invention include aliphatic diisocyanate compounds, e.g., hexamethylene diisocyanate and 2,2,4-trimethylhexamethylene diisocyanate, alicyclic diisocyanate compounds, e.g., isophorone diisocyanate, hydrogenated xylylene diisocyanate, and 4,4-cyclohexylmethane diisocyanate, araliphatic diisocyanate compounds, e.g., xylylene diisocyanate and tetramethylxylene diisocyanate, and aromatic diisocyanates, e.g., toluylene diisocyanate and phenylmethane diisocyanate.

Most of all, aliphatic diisocyanate compounds and alicyclic diisocyanates are preferable because light discoloration of the printed image does not easily occur.

Also, examples of general-purpose polyols having no anionic group include polyester polyols, polyether polyols, polyhydroxy polycarbonates, polyhydroxy polyacetals, polyhydroxy polyacrylates, polyhydroxy polyesteramides, and polyhydroxy polythioethers. Most of all, polyester polyols, polyether polyols, and polyhydroxy polycarbonates are preferable. One type of these polyols may be reacted or a plurality of types may be reacted in combination.

In addition to the above-described polyols, low-molecular-weight diols may be appropriately used together for the purpose of adjusting the film hardness and the like of the printings. Examples thereof include ethylene glycol, diethylene glycol, propylene glycol, dipropylene glycol, 1,2-propane diol, 1,3-propane diol, and 1,4-butane diol.

Examples of chain elongation agents used in the present invention include at least one of diols, e.g., ethylene glycol, propylene glycol, 1,4-butane diol, 1,6-hexane diol, 1,9-nonane diol, 1,4-bis(β-hydroxyethoxy)benzene, 1,4-cyclohexane diol, and xylylene glycol, and diamines, e.g., ethylene diamine, propylene diamine, xylylene diamine, isophorone diamine, 4,4'-diaminodiphenylmethane, tolylene diamine, and 4,4'-diaminodicyclohexylmethane.

The above-described urethane resin can be produced by, for example, reacting the polyol and the polyisocyanate in no solvent or in the presence of an organic solvent so as to produce an urethane resin, performing neutralization by using the above-described basic compound or the like, and making the resulting urethane resin having anionic groups into an aqueous resin by performing mixing into an aqueous medium, wherein mixing and reaction with the chain elongation agent are performed, as necessary.

The above-described reaction between the polyol and the polyisocyanate is performed while the equivalent ratio of isocyanate group included in the polyisocyanate to hydroxyl group included in the polyol is set to be preferably within the range of 0.8 to 2.5 and more preferably within the range of 0.9 to 1.5.

The weight average molecular weight of the urethane resin having anionic groups used in the present invention is within the range of preferably 5,000 to 500,000, more preferably 10,000 to 200,000, and particularly preferably 15,000 to 100,000.

Here, the weight average molecular weight refers to the value measured by GPC (gel permeation chromatography) method and is a value in terms of molecular weight of polystyrene used as a standard material. In the present invention, specifically, the measurement was performed as described below.

(Method for Measuring Weight Average Molecular Weight)

A glass plate was coated with the above-described urethane resin having anionic groups by a 3-mil applicator and drying was performed at ambient temperature for 1 hour so as to produce a half-dried coating film. The resulting coating film was peeled off the glass plate and a measurement sample was prepared by dissolving 0.4 g of the coating film into 100 g of tetrahydrofuran.

High performance liquid chromatograph Model HLC-8220 produced by Tosoh Corporation was used as the measuring apparatus. Regarding columns, Column TSK-GELs (HXL-H, G5000HXL, G4000HXL, G3000HXL, and G2000HXL) produced by Tosoh Corporation were used in combination.

A calibration curve was formed by using standard samples that are standard polystyrenes (molecular weight: 4,480,000, 4,250,000, 2,880,000, 2,750,000, 1,850,000, 860,000, 450,000, 411,000, 355,000, 190,000, 160,000, 96,400, 50,000, 37,900, 19,800, 15,600, 5,570, 4,000, 2,980, 2,030, and 500) produced by SHOWA DENKO K.K., and Toyo Soda Manufacturing Co., Ltd.

Tetrahydrofuran was used as an eluent and a sample dissolving liquid, and the weight average molecular weight was measured by using RI detector, where the flow rate was set to be 1 mL/min, the amount of sample injection was set to be 500 μL, and the sample concentration was set to be 0.4%.

Also, it is preferable that the urethane resin have an acid value within the range of 2 to 200 (mgKOH/g). In order to improve good water dispersion stability and the like of the urethane resin, the acid value within the range of 2 to 100 (mgKOH/g) is preferable. As a matter of course, the relationship with the weight average molecular weight satisfies (weight average molecular weight/acid value)<1,400.

The acid value here refers to at numerical value-measured in conformity with Japanese Industrial Standards "K0070: 1992. Test methods for acid value, saponification value, ester value, iodine value, hydroxyl value, and unsaponifiable matter of chemical products" and is an amount (mg) of potassium hydroxide required for completely neutralizing 1 g of resin. In the present invention, specifically, the acid value is measured as described below.

(Method for Measuring Acid Value)

The acid value of the resin was determined by dissolving 0.1 g of sample into a mixed solvent of methanol to toluene of 7:3 and performing titration with 0.1-M potassium hydroxide alcohol solution, where phenolphthalein was used as an indicator.

It is not preferable that the acid value be excessively low because the pigment dispersion and the storage stability are degraded and the printing stability is degraded in the case where an ink-jet recording aqueous ink, as described later, is prepared. Likewise, it is not preferable that the acid value be excessively high because the water resistance of colored recording image is degraded. In order to make the acid value of the copolymer to be within the above-described range, copolymerization may be performed while the polyol having carboxy groups is contained such that the acid value becomes within the above-described range.

Meanwhile, among the above-described copolymers, specific examples of particularly preferable acrylic copolymers include styrene-acrylic acid copolymers, e.g., styrene-(meth)acrylic acid copolymers, styrene-(meth)acrylic acid ester-(meth)acrylic acid copolymers, and (meth)acrylic acid ester-(meth)acrylic acid copolymers, that include styrene-based monomer and (meth)acrylic acid as raw material monomers. (In this regard, in the present invention, the "styrene-acrylic acid copolymer" is defined as "copolymer that includes styrene-based monomer and (meth)acrylic acid as raw material monomers", as described above. Therefore, a general-purpose monomer other than styrene-based monomer and (meth)acrylic acid may be copolymerized.)

The usage ratio of styrene-based monomer serving as the raw material for producing the styrene-acrylic acid copolymer is more preferably 50 to 90 percent by mass and 70 to 90 percent by mass is particularly preferable. In the case where the usage ratio of styrene-based monomer is 50 percent by mass or more, the affinity of the styrene-acrylic acid copolymer for the carbon black becomes good and the dispersion stability of the aqueous black pigment dispersion tends to be improved. Also, the plain paper recording characteristics of the ink-jet recording aqueous ink produced from the aqueous black pigment dispersion are improved, the image recording density tends to increase and, in addition, the water resistance characteristics tend to be enhanced. In the case where the amount of the styrene-based monomer is 90 percent by mass or less and within the above-described range, good dispersibility of the carbon black coated with the styrene-acrylic acid copolymer in the aqueous medium can be maintained, and the dispersibility and the dispersion stability of the pigment in the aqueous black pigment dispersion can be improved. Further, the printing stability is enhanced in the case of use as an ink-jet recording ink composition.

The above-described styrene-acrylic acid copolymer is obtained by copolymerization of the styrene-based monomer and at least one of the acrylic acid monomer and the methacrylic acid monomer, and it is preferable that the acrylic acid monomer and the methacrylic acid monomer be used together. This is because copolymerizability at the time of synthesis of the resin is enhanced so as to improve the homogeneity of the resin and, as a result, the storage stability is improved and a pigment dispersion containing finer particles tends to be obtained.

In the styrene-acrylic acid copolymer, it is preferable that a total sum of the styrene-based monomer, the acrylic, acid monomer, and the methacrylic acid monomer at the time of copolymerization be 95 percent by mass or more relative to the total monomer components.

A common polymerization method can be adopted as the method for manufacturing the styrene-acrylic acid copolymer, and a method, e.g., solution polymerization, suspension polymerization, or block polymerization, in which polymerization is performed in the presence of a polymerization catalyst, is adopted. Examples of polymerization catalysts include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide, and butyl peroxybenzoate. The amount of use thereof is preferably 0.1 to 10.0 percent by mass of vinyl monomer component.

Also, the styrene-acrylic acid copolymer may be a random copolymer or a graft copolymer. Examples of graft copolymers include a graft copolymer, in which polystyrene or a copolymer of styrene and a nonionic monomer copolymerizable with styrene serves as a trunk or a branch and a copolymer of acrylic acid, methacrylic acid, and other monomers including styrene serves as a branch or a trunk. The styrene-acrylic acid copolymer may be a mixture of the graft copolymer and the random copolymer.

In the present invention, the weight average molecular weight of the acrylic copolymer having anionic groups is preferably within the range of 5,000 to 20,000. For example, in the case where the styrene-acrylic acid copolymer is used, the weight average molecular weight thereof is preferably within the range of 5,000 to 20,000 and more preferably within the range of 5, 000 to 18,000. Most of all, within the range of 5,500 to 15,000 is particularly preferable. Here, the weight average molecular weight refers to the value measured by GPC (gel permeation chromatography) method and is a value in terms of molecular weight of polystyrene used as a standard material, which is specifically the same as that, described in the above-described item "Method for measuring weight average molecular weight" of the urethane resin having anionic groups.

The styrene-acrylic acid copolymer used in the present invention has carboxyl groups derived from the acrylic acid monomer and the methacrylic acid monomer and the acid value thereof is preferably 50 to 220 (mgKOH/g) and further preferably 60 to 200 (mgKOH/g). In the case where the acid value is 220 (mgKOH/g) or less, an occurrence of coagulation of the pigment tends to become more difficult.

Meanwhile, the method for measuring the acid value is the same as "Method for measuring acid value" of the polyurethane resin having anionic groups, as described above. Also, as a matter of course, the relationship with the weight average molecular weight satisfies (weight average molecular weight/acid value)<120.

It is not preferable that the acid value be excessively low because the pigment dispersion and the storage stability are degraded and the printing stability is degraded in the case where an ink-jet recording aqueous ink, as described later, is prepared. Likewise, it is not preferable that the acid value be excessively high because the water resistance of colored recording image is degraded. In order to make the acid value of the copolymer to be within the above-described range, copolymerization may be performed while (meth)acrylic acid is contained such that the acid value becomes within the above-described range.

In addition, it is preferable that the timing of addition of the resin having anionic groups to the aqueous black pigment dispersion after the dispersion is finished be as soon as possible in order to suppress degradation of the characteristics. Specifically, within 7 days after finishing of the dispersion is desirable and within 1 day is further preferable.

(Basic Compound)

In the present invention, the basic compound is used for the purpose of neutralizing the anionic groups of the urethane resin having anionic groups. Known basic compounds can be used, and examples thereof include inorganic basic compounds such as hydroxides of alkali metals, e.g., potassium and sodium; carbonates of alkali metals, e.g., potassium and sodium; carbonates of alkaline earth metals, e.g., calcium and barium, and the like; and ammonium hydroxide and organic basic compounds such as aminoalcohols, e.g., triethanolamine, N,N-dimethanolamine, N-aminoethylethanolamine, dimethylethanolamine, and N-N-butyldiethanolamine, morpholine and the like, e.g., morpholine, H-methylmorpholine and N-ethylmorpholine, and piperazine and the like, e.g., N-(2-hydroxyethyl)piperazine and piperazine hexahydrate. Most of all, alkali metal hydroxides typified by potassium hydroxide, sodium hydroxide, and lithium hydroxide are preferable from the viewpoint of election stability of the ink-jet recording ink because of contribution to lowering the viscosity of the aqueous black pigment dispersion, and potassium hydroxide is particularly preferable.

There is no particular limitation regarding the percentage of neutralization of the anionic groups by using the basic compound. In general, the percentage of neutralization is in the range of 80% to 120% in many cases. In this regard, the percentage of neutralization in the present invention refers to a numerical value that indicates the percentage of the amount of mixing of the basic compound relative to the amount required for neutralizing all carboxyl groups in the organic high-molecular-weight compound having anionic groups and is calculated by the following formula.

percentage of neutralization (%)=[{mass of basic compound (g)×56.11×1000}/{resin acid value (mgKOH/g)×equivalent of basic compound× amount of resin (g)}]×100     [Math. 1]

At this time, in the case where acidic carbon black is used as the carbon black, the pH of the resulting aqueous black pigment dispersion decreases, the solubility of the resin having anionic groups into water decreases, and poor dispersion and degradation of the storage stability may occur. In this case, the resin having anionic groups may be added to the aqueous black pigment dispersion such that the percentage of neutralization becomes more than the range of 80% to 120%.

Also, in general, the viscosity of the aqueous black pigment dispersion is set to be 0.1 to 100 mPa·s in many cases. However, the viscosity is not specifically limited because the viscosity is changed by the concentration of carbon black, the concentration of the resin having anionic groups, the type and the molecular weight of the resin, having anionic groups, the type of the aqueous medium, additives, and the like. Also, in the case where the viscosity is higher than the predetermined viscosity and inconvenience is found in the handling, it is possible to appropriately dilute with an aqueous medium so as to adjust the aqueous black pigment dispersion to have a viscosity within the predetermined range.

In consideration of the handling, e.g., dilution, thereafter, the carbon concentration is preferably 1 to 30 percent by mass and most preferably 5 to 20 percent by mass in general. Also, as described above, the amount of resin in the paste is preferably 0.05 to 0.50 and further preferably 0.10 to 0.40, where the proportion of resin is denoted as "amount of resin having anionic group/mass of carbon black".

(Ink-jet Recording Aqueous Ink)

The aqueous black pigment dispersion can be diluted so as to have a predetermined concentration and, thereby, be used in various applications, e.g., a field of paints for automobiles and building materials, a field of printing inks, e.g., offset inks, gravure inks, flexographic inks, and silk screen inks, and a field of ink-jet recording inks.

In the case where the aqueous black pigment dispersion according to the present invention is applied to the ink-jet recording ink, adjustment to predetermined properties is performed by further adding an aqueous solvent and/or water, an organic high-molecular-weight compound having anionic groups for the purpose of serving as a binder, and the like and adding, as necessary, a wetting agent, (drying retarder), a penetrant, and other additives.

After the ink is adjusted, a centrifugal separation or filtration step may be applied.

(Wetting Agent)

The wetting agent is added for the purpose of preventing drying of the ink. The content of wetting agent in the ink for the purpose of preventing drying is preferably 3 to 50 percent by mass.

There is no particular limitation regarding the wetting agent used in the present invention. However, it is preferable that the wetting agent have miscibility with water and exhibit an effect of preventing plugging of an ink-jet printer head. Examples thereof include glycerin, ethylene glycol, diethylene glycol, triethylene glycol, polyethylene glycol having a molecular weight of 2,000 or less, propylene glycol, dipropylene glycol, tripropylene glycol, 1,3-propylene glycol, isopropylene glycol, isobutylene glycol, 1,4-butane diol, 1,3-butane diol, 1,5-pentane diol, 1,6-hexane diol, meso-erythritol, and pentaerythritol. Most of all, when propylene glycol or 1,3-butyl glycol is included, the safety is secured and excellent effects are exerted on ink drying property and ejection performance.

(Penetrant)

The penetrant is added for the purpose of improving the permeability into the recording medium and adjusting the dot diameter on the recording medium.

Examples of penetrants include lower alcohols, e.g., ethanol and isopropyl alcohol, ethylene oxide adducts of alkyl alcohols, e.g., ethylene glycol hexyl ether and diethylene glycol butyl ether, and propylene oxide adducts of alkyl alcohols, e.g., propylene glycol propyl ether. The content of the penetrant in the ink is preferably 0.01 to 10 percent by mass.

(Surfactant)

The surfactant is added for adjusting the ink characteristics, e.g., a surface tension. There is no particular limitation regarding the surfactant to be added for this purpose. Examples thereof include various anionic surfactants, non-ionic surfactants, cationic surfactants, and amphoteric surfactants. Among them, anionic surfactants and nonionic surfactants are preferable.

Examples of anionic surfactants include alkylbenzene sulfonates, alkylphenyl sulfonates, alkylnaphthalene sulfonates, higher fatty acid salts, sulfuric acid ester salts of higher fatty acid esters, sulfonates of higher fatty acid esters, sulfuric acid ester salts and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples thereof include dodecylbenzene sulfonates, isopropylnaphthalene sulfonates, monobutylphenylphenol monosulfonates, monobutylbiphenyl sulfonates, and dibutylphenylphenol disulfonates.

Examples of non-ionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylolamides, alkylalkanolamides, acetylene glycol, oxyethylene adducts of acetylene glycol, and polyethylene glycol polypropylene glycol block copolymers. Among them, polyoxyethylene nonylphenyl ethers, polyoxyethylene octylphenyl ethers, polyoxyethylene dodecylphenyl ethers, polyoxyethylene alkyl ethers, polyoxyethylene fatty acid esters, sorbitan fatty acid esters, polyoxyethylene sorbitan fatty acid esters, fatty-acid alkylolamides, acetylene glycol, oxyethylene adducts of acetylene glycol, and polyethylene glycol polypropylene glycol block copolymers are preferable.

Other surfactants, for example, silicone-based surfactants such as polysiloxane oxyethylene adducts; fluorine-based surfactants such as perfluoroalkyl carboxylates, perfluoroalkyl sulfonates, and oxyethylene perfluoroalkyl ethers; and biosurfactants such as spiculisporic acid, rahmnolipid, and lysolecithin can also be used.

These surfactants can be used alone or at least two types can be used in combination. In the case where the surfactant is added, the amount of addition is preferably within the range of 0.001 to 2 percent by mass relative to the total mass of the ink, more preferably 0.001 to 1.5 percent by mass, and further preferably within the range of 0.01 to 1 percent by mass. If the amount of addition of the surfactant is less than 0.001 percent by mass, there are tendencies of effects of addition of the surfactant not to be exerted. If the amount of addition is more than 2 percent by mass, problems that the image blurs and the like occur easily.

Also, as necessary, antiseptics, viscosity adjusters, pH adjusters, chelating agents, plasticizers, antioxidants, ultraviolet absorbers, and the like can be added.

(Recording Member)

An aqueous black ink produced from the aqueous black pigment dispersion according to the present invention realizes a high optical density particularly on plain paper and, therefore, is particularly suitable for printing on the plain paper. As a matter of course, the aqueous black ink is used for other absorbable recording members.

Examples, of absorbable recording media include plain paper, (ultra lightweight) coated paper, cloth, ink-jet paper, ink-jet glossy paper, corrugated cardboard, and wood.

EXAMPLES

The examples according to the present invention will be described below in detail.

In this regard, a term "part" refers to "parts by mass" and a term "%" refers to "percent by mass" unless otherwise specified.

(Method for Preparing Carbon Black having Carboxylic Acid Group)
(Oxidation Treatment of Carbon Black)
An oxidation treatment was performed by putting 100 parts of MA600 (produced by MITSUBISHI CHEMICAL CORPORATION) serving as carbon black into 4,000 parts of sodium peroxodisulfate aqueous solution (concentration of 1.5 mol/L) and performing agitation at a temperature of 85° C. and an agitation rate of 0.12/s, where the agitation time was changed.

Subsequently, the carbon black was filtrated and dispersed into pure water. After neutralization was performed with sodium hydroxide, remaining salts were removed by an ultrafiltration membrane AHP-1010 (produced by Asahi Kasei Corporation). Then, filtration and drying were performed so as to obtain each carbon black (Carbon black Nos. CB1 to CB3, CB5, CB6, and CB8) having an amount of carboxylic acid on the surface different from that of another carbon black. In this regard, MA600 without being treated was denoted as CB9.

Also, MA77 (produced by MITSUBISHI CHEMICAL CORPORATION) was used as a commercially available carbon black having carboxylic acid groups and was denoted as Carbon black No. CB4.

In this regard, the amount of carboxylic acid and BET value (specific surface area) of each carbon black were measured by the methods described below. The values thereof are shown in Table 1.

(Method for Measuring Amount of Carboxylic Acid)
After 0.2 g of carbon black was weighed into a polyethylene container, 5 mL of 0.1 N-sodium hydrogen carbonate ($NaHCO_3$) aqueous solution and 25 mL of distilled water were added, agitation was performed sufficiently, the resulting solution was left to stand at room temperature for a night or more, and ultrafiltration was performed so as to obtain a filtrate. After 8 mL of the resulting filtrate was taken, titration, was performed, with 0.01-N hydrochloric acid (HCl) so as to determine the amount of HCl when the color of the filtrate was changed (yellow→orange), where methyl orange was used as an indicator. In addition, the amount of carboxylic acid (COOH) per gram of carbon was calculated by using the following calculation formula.

$$\text{amount of COOH (}\mu\text{ mol)} = \{\text{titer of blank titration (ml)} - \text{titer (ml)}\}/1000 \times \text{chloric acid concentration (mol/l)} \times 5 \text{ (mL)}/30 \text{ (ml)} \times 8 \text{ (ml)} \times 10^6 \quad [\text{Math. 2}]$$

(Method for Measuring BET Value)
After 0.1 g of carbon black was put into a glass cell, a specific surface area measuring apparatus "Macsorb HM Model-120 (produced by MOUNTECH) was used, deaeration was performed at a temperature of 300° C. for 30 minutes, and BET value was measured.

In Table 1, CB is abbreviation of carbon black.
(Resin Having Anionic Group Method for Manufacturing Urethane Resin Aqueous Solution PU5)

A nitrogen-purged container provided with a thermometer, a nitrogen gas introduction tube, and an agitator was charged with 64.2 parts by mass of methyl ethyl ketone. As shown in Table 2, 18.4 parts by mass of 2,2-dimethylol propionic acid and 33.9 parts by mass of isophorone diisocyanate were mixed in the methyl ethyl ketone, and a reaction was performed at 80° C. for 4 hours. After a lapse of 4 hours, 38.2 parts by mass of methyl ethyl ketone was further supplied, and cooling to 60° C. or lower was performed. Subsequently, 140.1 parts by mass of polyether polyol ("PTMG2000", polytetramethylene glycol produced by MITSUBISHI CHEMICAL CORPORATION, number average molecular weight of 1,000) and 0.01 parts by mass of dibutyltin dilaurate (hereafter referred to as DBTDL) were added and the reaction was continued at 80° C.

After it was ascertained that the weight average molecular weight of the reaction product reached the range of 20,000 to 50,000, the reaction was terminated by putting 1.3 parts by mass of methanol therein. Then, 41.6 parts by mass of methyl ethyl ketone was added so as to obtain an organic solvent solution of an urethane resin.

At least part of carboxyl groups included in the urethane resin was neutralized by adding 15.1 parts by mass of 50-percent-by-mass potassium hydroxide aqueous solution serving as the basic compound to the organic solvent solution of the urethane resin. Thereafter, 848.5 parts by mass of water was added and agitation was performed sufficiently so as to obtain a mixture in which the urethane resin, methyl ethyl ketone, and water were contained and the urethane resin was dispersed or dissolved in the water.

Subsequently, the mixture was aged for about 2 hours, 0.07 parts by mass of Surfynol 440 (produced by Air Products and Chemicals, Inc., ethylene oxide adduct of acetylene glycol, non-volatile content of 100 percent by mass) was added, and agitation was performed for about 20 minutes so as to obtain a mixture. The resulting mixture was distilled under reduced pressure at about 1 to 50 kPa.

After it was ascertained that 144 parts by mass of methyl ethyl ketone contained in the mixture was removed, 0.03 parts by mass of Surfynol 440 (produced by Air Products and Chemicals, Inc.) was added under reduced pressure, and distillation under reduced pressure was continued. Subsequently, it was ascertained that 147 parts by mass of water

TABLE 1

| CB No. | Commercially available CB | Oxidation treatment | Primary particle diameter (nm) | Amount of carboxylic acid ($\mu$mol/g) | BET value ($m^2$/g) | Amount of carboxylic acid/BET value ($\mu$mol/$m^2$) |
|---|---|---|---|---|---|---|
| CB1 | MA600 | yes | 20 | 758 | 143 | 5.30 |
| CB2 | MA600 | yes | 20 | 450 | 145 | 3.10 |
| CB3 | MA600 | yes | 20 | 243 | 143 | 1.70 |
| CB4 | MA77 | none | 23 | 96 | 109 | 0.88 |
| CB5 | MA600 | yes | 20 | 97 | 140 | 0.69 |
| CB6 | MA600 | yes | 20 | 88 | 145 | 0.61 |
| CB7 | MA100 | none | 24 | 43 | 92 | 0.47 |
| CB8 | MA600 | yes | 20 | 36 | 145 | 0.25 |
| CB9 | MA600 | none | 20 | 0 | 143 | 0.00 | contained in the mixture was removed, and the distillation under reduced pressure was finished.

Then, the non-volatile content was adjusted by adding water so as to obtain 1,000 parts by mass of Urethane resin aqueous solution PU5 having a non-volatile content of 20 percent by mass. The acid value and the weight average molecular weight of Urethane resin PU5 are shown in Table 3.

(Method for Manufacturing Urethane Resin Aqueous Solution PU1 having Anionic Group)

In a nitrogen-purged container provided with a thermometer, a nitrogen gas introduction tube, and an agitator, as shown in Table 2, 112.0 parts by mass of polyether polyol ("EXCENOL2020", propylene glycol produced by ASAHI GLASS CO., LTD., number average molecular weight, of 1,000), 11.2 parts by mass of 2,2-dimethylol propionic acid, 12.0 parts by mass of 1,4-cyclohexane dimethanol, and 60.4 parts by mass of isophorone diisocyanate were reacted at 80° C. for 4 hours in the presence of 64.7 parts by mass of methyl ethyl ketone serving as an organic solvent. After 39.9 parts by mass of methyl ethyl ketone serving as a dilution solvent was added and the reaction was further continued.

At the point in time when the weight average molecular weight of the reaction product generated by the reaction reached the range of 20,000 to 50,000, the reaction was terminated by putting 1.6 parts by mass of methanol therein. Then, 40.3 parts by mass of methyl ethyl ketone serving as a dilution solvent was added so as to obtain an organic solvent solution of an urethane resin.

Subsequently, at least part of carboxyl groups included in the urethane resin was neutralized by adding 8.8 parts by mass of 50-percent-by-mass potassium hydroxide aqueous solution to the organic solvent solution of the urethane resin. Thereafter, 795.6 parts by mass of water was added, and agitation was performed sufficiently. Further, aging was performed about 1 hour, and the solvent was removed. Then, the non-volatile content was adjusted by adding water so as to obtain Urethane resin aqueous solution PU1 having a resin solid content of 20 percent by mass. The acid value and the weight average molecular weight of Urethane resin PU1 are shown in Table 3.

(Method for Manufacturing Urethane Resin Aqueous Solutions PU2, PU3, PU4, PU6, and PU7 having Anionic Group)

Urethane resin aqueous solutions PU2, PU3, PU4, PU6, and PU7 having different acid values and weight average molecular weights were obtained in the same manner as the method for manufacturing Urethane resin aqueous solution PU1, where the amount, of polyether polyol, the amount of 2,2-dimethylol propionic acid, the mount, of cyclohexane dimethanol, and the amount of isophorone diisocyanate were adjusted as shown in Table 2. The acid values and the weight average molecular weights of the resulting resins are shown in Table 3.

In Table 2, numerical values are in parts by mass.

TABLE 3

| Name of urethane resin aqueous solution | Acid value | Weight average molecular weight |
| --- | --- | --- |
| PU1 | 23 | 34100 |
| PU2 | 39 | 29800 |
| PU3 | 41 | 43800 |
| PU4 | 42 | 35200 |
| PU5 | 55 | 42000 |
| PU6 | 58 | 43800 |
| PU7 | 32 | 42500 |

(Method for Measuring Weight Average Molecular Weight)

A glass plate was coated with the urethane resin by a 3-mil applicator and drying was performed at ambient temperature for 1 hour so as to produce a half-dried coating film. The resulting coating film was peeled off the glass plate and a measurement sample was prepared by dissolving 0.4 g of the coating film into 100 g of tetrahydrofuran.

High performance liquid chromatograph Model HLC-8220 produced by Tosoh Corporation was used as the measuring apparatus. Regarding columns, Column TSK-GELs (HXL-H, G5000HXL, G4000HXL, G3000HXL, and G2000HXL) produced by Tosoh Corporation were used in combination.

A calibration curve was formed by using standard samples that are standard polystyrenes (molecular weight: 4,480,000, 4,250,000, 2,880,000, 2,750,000, 1,850,000, 860,000, 450,000, 411,000, 355,000, 190,000, 160,000, 96,400, 50,000, 37,900, 19,800, 19,600, 5,570, 4,000, 2,380, 2,030, and 500) produced by SHOWA DENKO K.K., and Toyo Soda Manufacturing Co., Ltd.

Tetrahydrofuran was used as an eluent and a sample dissolving liquid, and the weight average molecular weight was measured by using RI detector, where the flow rate was set to be 1 mL/min, the amount of sample injection was set to be 500 µL, and the sample concentration was set to be 0.4%.

(Method for Measuring Acid Value)

The acid value of the resin was determined by dissolving 0.1 g of sample into a mixed solvent of methanol to toluene of 7:3 and performing titration with 0.1-M potassium hydroxide alcohol solution, where phenolphthalein was used as an indicator.

(Resin having Anionic Group Method for Manufacturing Styrene-acrylic Resin Aqueous Solution StAc4)

A resin solution was obtained by adding 87.4 parts of ion-exchanged water and 22 g of 34-percent-by-mass potassium hydroxide (KOH) aqueous solution serving as a basic compound to 50 parts of resin, which had a monomer composition ratio of styrene/methacrylic acid/acrylic

TABLE 2

| Name of urethane resin aqueous solution | Isophorone diisocyanate | 2,2-Dimethylol propionic acid | PTMG2000 | EXCENOL 2020 | 1,4-Cyclohexane dimethanol | 50% Potassium hydroxide |
| --- | --- | --- | --- | --- | --- | --- |
| PU1 | 60.4 | 11.2 | 0 | 112 | 12 | 8.8 |
| PU2 | 63.2 | 18.4 | 0 | 103.8 | 7.2 | 14.8 |
| PU3 | 56.2 | 19 | 0 | 117.2 | 0 | 15.2 |
| PU4 | 56.2 | 19 | 0 | 117.2 | 0 | 15.2 |
| PU5 | 33.9 | 18.4 | 140.1 | 0 | 0 | 21.2 |
| PU6 | 72 | 26.6 | 0 | 83.6 | 7.6 | 21.2 |
| PU7 | 62 | 14.8 | 0 | 108 | 9.6 | 11.2 | acid=77/13/10 (mass ratio), as shown in Table 4, a weight average molecular weight of 8,800, an acid value of 150 mgKOH/g, and a glass transition temperature of 107° C., and 50 parts of methyl ethyl ketone (hereafter abbreviated as MEK) and performing agitation sufficiently. The resulting resin solution was made to have a resin content of 20% by removing MEK at a water bath temperature of 45° C. under reduced pressure at 40 hPa and was denoted as Acrylic resin aqueous solution StAc4. The acid value and the weight average molecular weight of the resin are shown in Table 5.

(Method for Manufacturing Acrylic Resin Aqueous Solutions StAc1 to StAc3, StAc5, and StAc6)

Acrylic resin aqueous solutions StAc1, StAc2, StAc3, StAc5, and StAc6 having different acid values and weight average molecular weights were obtained in the same manner as the method for manufacturing Acrylic resin aqueous solution StAc4 except that the monomer composition ratio of styrene/methacrylic acid/acrylic acid and the like were adjusted as shown in Table 4. The acid values and the weight average molecular weights of the resins are shown in Table 5.

TABLE 4

| Name of styrene-acrylic resin aqueous solution | Styrene | Methacrylic acid | Acrylic acid |
|---|---|---|---|
| StAc1 | 86 | 7.86 | 6.04 |
| StAc2 | 83 | 9.55 | 7.35 |
| StAc3 | 83 | 9.55 | 7.35 |
| StAc4 | 77 | 13 | 10 |
| StAc5 | 77 | 13 | 10 |
| StAc6 | 72 | 15.77 | 12.13 |
| StAc7 | 77 | 13 | 10 |

TABLE 5

| Name of styrene-acrylic resin aqueous solution | Acid value | Weight average molecular weight |
|---|---|---|
| StAc1 | 94 | 13400 |
| StAc2 | 120 | 11000 |
| StAc3 | 116 | 30500 |
| StAc4 | 150 | 8800 |
| StAc5 | 150 | 11000 |
| StAc6 | 180 | 11000 |
| StAc7 | 153 | 17600 |

(Examples and Comparative Examples, in which Carbon Black Species to be used is Changed)

Example 1

The following materials were put into a metal beaker, and manual agitation was performed sufficiently so as to obtain a mixture.
Carbon black CB1: 15 parts by mass
Ion-exchanged water: 85 parts by mass
Basic compound (34-percent potassium hydroxide aqueous solution): 2.2 parts by mass The resulting mixture was further subjected to ultrasonic dispersion for 3 minutes by using an ultrasonic dispersing machine described below. In this regard, the applied energy per unit carbon black at this time was 0.7 W/g.
Ultrasonic dispersing machine (UP200St produced by hielscher)
Maximum output: 200 W
Frequency: 26 kHz After a lapse of 30 minutes from finishing of dispersion, 15 parts by mass (3 parts by mass as resin solid content) of Urethane resin aqueous solution PUS was added as a resin having anionic groups, and manual dispersion was performed sufficiently so as to obtain an aqueous black pigment dispersion.

At this time, the proportion of resin in the resulting aqueous black pigment dispersion was 3/15=0.2, where the proportion of resin was denoted as "mass of resin having anionic group/mass of carbon black" and was an indicator of the amount of addition of the resin having anionic groups.

Examples 2 TO 8

An aqueous black pigment dispersion in Example 2 was obtained in the same manner as Example 1 except that StAc4was used as the resin having anionic groups to be added after finishing of dispersion.

In addition, aqueous black pigment dispersions in Examples 3 to 8 were obtained in the same manner as Example 1 or Example 2 except that carbon black shown in Table 6 was used.

Examples 9 to 14

Aqueous black pigment dispersions were obtained in the same manner as Example 1 except that the carbon black to be used was fixed to CB2 and PU described in Table 9 was used as the resin having anionic groups to be added after finishing of dispersion.

Examples 15 to 19

Aqueous black pigment dispersions were obtained in the same manner as Example 1 except that the carbon black to be used was fixed to CB2 and styrene acrylic resin described in Table 9 was used as the resin having anionic groups to be added after finishing of dispersion.

Comparative Examples 1 TO 12

An aqueous black pigment dispersion of Comparative example 1 described in Table 7 was obtained in the same manner as Example 1 except that a resin was not added at the time of dispersion nor after dispersion. Further, an aqueous black pigment dispersion of Comparative example 2 described in Table 7 was obtained in the same manner as Example 1 except that the timing of addition of the resin was not after dispersion but before dispersion. Likewise, an aqueous black pigment dispersion of Comparative example 3 described in Table 7 was obtained in the same manner as Example 2 except that the timing of addition of the resin was not after dispersion but before dispersion.

In addition, aqueous black pigment dispersions of Comparative examples 4 to 12 were obtained in the same manner as Comparative example 1, Comparative example 2, or Comparative example 3, where the conditions are shown in Table 7.

Comparative Examples 13 TO 22

An aqueous black pigment dispersion of Comparative example 13 shown in Table 8 was obtained by using the same method as Example 1 except that the carbon to be used was set to be CB5.

Further, an aqueous black pigment dispersion of Comparative example 14 shown in Table 8 was obtained by using the same method as Example 2 except that the carbon to be used was set to be CB5.

In addition, aqueous black pigment dispersions of Comparative examples 15 to 22 were obtained, by using the same method as Example 13 or Example 14, where the conditions are shown in Table 8.

Comparative Examples 23 TO 37

An aqueous black pigment dispersion of Comparative example 23 shown in Table 8 was obtained by using the same method as Comparative example 1 except, that the carbon to be used was set to be CB5.

Likewise, an aqueous black pigment dispersion of Comparative example 24 shown in Table 8 was obtained by using the same method as Comparative example 2 except that the carbon to be used was set to be CB5.

Likewise, an aqueous black pigment dispersion of Comparative example 25 shown in Table 8 was obtained by using the same method as Comparative example 3 except that the carbon to be used was set to be CB5.

In addition, aqueous black pigment dispersions of Comparative examples 26 to 37 were obtained in the same manner as Comparative example 23, Comparative example 24, or Comparative example 25, where the conditions are shown in Table 8.

(Method for Evaluating Dispersibility)

The volume average particle diameter of each of the aqueous black pigment dispersions obtained in the examples and the comparative examples was measured by using Nanotrac UPA-150EX (NIKKISO CO., LTD.). Regarding the indicator of the dispersibility, a measured volume average particle diameter was expressed as described below.

less than 200 (nm) ○
200 (nm) or more x (Method for Evaluating Stability)

Each of the aqueous black pigment dispersions obtained in the examples and the comparative examples was hermetically sealed in a polyethylene container and was stored in an atmosphere at 60° C. for 14 days. The viscosities before storage and after storage of the aqueous-black pigment dispersion were measured. The measurement was performed by using Viscometer TV-20 (Toki Sangyo Co., Ltd.). The indicator of the stability was expressed, as described below, on the basis of the above-described viscosities measured before and after storage.

(viscosity after storage/viscosity before storage−1)×100% of less than 10% ⊙

(viscosity after storage/viscosity before storage−1)×100% of less than 20% ○

(viscosity after storage/viscosity before storage−1)×100% of 20% or more x (Measurement of OD Value)

Each of the aqueous black pigment dispersions obtained in the examples and the comparative examples was diluted with water so as to have a pigment concentration of 4% and was applied to PPC paper by using Wire bar #3. After air drying was performed for 30 minutes, the OD value of the coated portion was measured. The measurement was performed by using "Gretag Macbeth Spectro Scan Transmission" (X-Rite).

The OD value depends on the type of paper to a great extent and, therefore, it is not possible to clearly determine whether the result is good or no good. However, it is considered to be good when the OD value is about 1.2 or more.

Table 6 to Table 10 show the carbon black species used in the examples and the comparative examples, the resin species having anionic groups, the methods of addition and the proportions of addition, the evaluation results of the obtained aqueous black pigment dispersions.

TABLE 6

| | No. | Name of carbon black | Amount of carboxylic acid/specific surface area (μmol/m²) | Added resin | Proportion of resin during dispersion | Proportion of resin added after dispersion | Dispersed particle diameter (nm) | Dispersibility | Stability | OD |
|---|---|---|---|---|---|---|---|---|---|---|
| Example | 1 | CB1 | 5.30 | PU5 | 0 | 0.50 | 131 | ○ | ○ | 1.32 |
| | 2 | CB1 | 5.30 | StAc4 | 0 | 0.50 | 129 | ○ | ○ | 1.31 |
| | 3 | CB1 | 5.30 | PU5 | 0 | 0.20 | 130 | ○ | ○ | 1.35 |
| | 4 | CB1 | 5.30 | StAc4 | 0 | 0.20 | 130 | ○ | ○ | 1.35 |
| | 5 | CB2 | 3.10 | PU5 | 0 | 0.20 | 143 | ○ | ⊙ | 1.43 |
| | 6 | CB2 | 3.10 | StAc4 | 0 | 0.20 | 143 | ○ | ⊙ | 1.41 |
| | 7 | CB3 | 1.70 | PU5 | 0 | 0.20 | 156 | ○ | ○ | 1.22 |
| | 8 | CB3 | 1.70 | StAc4 | 0 | 0.20 | 153 | ○ | ○ | 1.34 |
| | 9 | CB4 | 0.88 | PU5 | 0 | 0.20 | 176 | ○ | ⊙ | 1.21 |
| | 10 | CB4 | 0.88 | StAc4 | 0 | 0.20 | 163 | ○ | ⊙ | 1.23 |

TABLE 7

| | No. | Name of carbon black | Amount of carboxylic acid/specific surface area (μmol/m²) | Added resin | Proportion of resin during dispersion | Proportion of resin added after dispersion | Dispersed particle diameter (nm) | Dispersibility | Stability | OD |
|---|---|---|---|---|---|---|---|---|---|---|
| Comparative example | 1 | CB1 | 5.30 | — | 0 | 0 | 130 | ○ | X | 1.40 |
| | 2 | CB1 | 5.30 | PU5 | 0.20 | 0 | 130 | ○ | X | 1.39 |
| | 3 | CB1 | 5.30 | StAc4 | 0.20 | 0 | 130 | ○ | X | 1.38 |
| | 4 | CB2 | 3.10 | — | 0 | 0 | 143 | ○ | X | 1.41 |
| | 5 | CB2 | 3.10 | PU5 | 0.20 | 0 | 140 | ○ | X | 1.43 |
| | 6 | CB2 | 3.10 | StAc4 | 0.20 | 0 | 145 | ○ | X | 1.42 |
| | 7 | CB3 | 1.70 | — | 0 | 0 | 138 | ○ | X | 1.43 |

TABLE 7-continued

| No. | Name of carbon black | Amount of carboxylic acid/specific surface area ($\mu mol/m^2$) | Added resin | Proportion of resin during dispersion | Proportion of resin added after dispersion | Dispersed particle diameter (nm) | Dispersibility | Stability | OD |
|---|---|---|---|---|---|---|---|---|---|
| 8 | CB3 | 1.70 | PU5 | 0.20 | 0 | 138 | ○ | X | 1.27 |
| 9 | CB3 | 1.70 | StAc4 | 0.20 | 0 | 136 | ○ | X | 1.36 |
| 10 | CB4 | 0.88 | — | 0 | 0 | 144 | ○ | X | 1.10 |
| 11 | CB4 | 0.88 | PU5 | 0.20 | 0 | 134 | ○ | ○ | 1.07 |
| 12 | CB4 | 0.88 | StAc4 | 0.20 | 0 | 126 | ○ | ○ | 1.16 |

TABLE 8

| | No. | Name of carbon black | Amount of carboxylic acid/specific surface area ($\mu mol/m^2$) | Added resin | Proportion of resin during dispersion | Proportion of resin added after dispersion | Dispersed particle diameter (nm) | Dispersibility | Stability | OD |
|---|---|---|---|---|---|---|---|---|---|---|
| Comparative example | 13 | CB5 | 0.69 | PU5 | 0 | 0.20 | 296 | X | X | 0.80 |
| | 14 | CB5 | 0.69 | StAc4 | 0 | 0.20 | 296 | X | X | 0.77 |
| | 15 | CB6 | 0.61 | PU5 | 0 | 0.20 | 398 | X | X | 0.79 |
| | 16 | CB6 | 0.61 | StAc4 | 0 | 0.20 | 502 | X | X | 0.75 |
| | 17 | CB7 | 0.47 | PU5 | 0 | 0.20 | 480 | X | X | 0.76 |
| | 18 | CB7 | 0.47 | StAc4 | 0 | 0.20 | 492 | X | X | 0.73 |
| | 19 | CB8 | 0.25 | PU5 | 0 | 0.20 | 399 | X | X | 0.80 |
| | 20 | CB8 | 0.25 | StAc4 | 0 | 0.20 | 432 | X | X | 0.77 |
| | 21 | CB9 | 0 | PU5 | 0 | 0.20 | 399 | X | X | 0.70 |
| | 22 | CB9 | 0 | StAc4 | 0 | 0.20 | 480 | X | X | 0.69 |
| | 23 | CB5 | 0.69 | — | 0 | 0 | 296 | X | X | 1.40 |
| | 24 | CB5 | 0.69 | PU5 | 0.20 | 0 | 208 | X | ○ | 1.14 |
| | 25 | CB5 | 0.69 | StAc4 | 0.20 | 0 | 205 | X | ○ | 1.40 |
| | 26 | CB6 | 0.61 | — | 0 | 0 | 500 | X | X | 0.90 |
| | 27 | CB6 | 0.61 | PU5 | 0.20 | 0 | 141 | ○ | ○ | 1.13 |
| | 28 | CB6 | 0.61 | StAc4 | 0.20 | 0 | 130 | ○ | ○ | 1.15 |
| | 29 | CB7 | 0.47 | — | 0 | 0 | 892 | X | X | 0.78 |
| | 30 | CB7 | 0.47 | PU5 | 0.20 | 0 | 148 | ○ | ⊙ | 1.15 |
| | 31 | CB7 | 0.47 | StAc4 | 0.20 | 0 | 152 | ○ | ⊙ | 1.15 |
| | 32 | CB8 | 0.25 | — | 0 | 0 | 768 | X | X | 0.80 |
| | 33 | CB8 | 0.25 | PU5 | 0.20 | 0 | 144 | ○ | ⊙ | 1.12 |
| | 34 | CB8 | 0.25 | StAc4 | 0.20 | 0 | 141 | ○ | ⊙ | 1.12 |
| | 35 | CB9 | 0 | — | 0 | 0 | 1026 | X | X | 0.70 |
| | 36 | CB9 | 0 | PU5 | 0.20 | 0 | 100 | ○ | ⊙ | 0.98 |
| | 37 | CB9 | 0 | StAc4 | 0.20 | 0 | 100 | ○ | ⊙ | 0.98 |

TABLE 9

| | No. | Name of carbon black | Resin added after dispersion | Acid value | Weight average molecular weight | Molecular weight/acid value | Dispersed particle diameter (nm) | Dispersibility | Stability | OD |
|---|---|---|---|---|---|---|---|---|---|---|
| Example | 11 | CB2 | PU6 | 58 | 43800 | 755 | 142 | ○ | ⊙ | 1.39 |
| | 12 | CB2 | PU2 | 39 | 29800 | 764 | 143 | ○ | ⊙ | 1.42 |
| | 13 | CB2 | PU5 | 55 | 42000 | 764 | 143 | ○ | ⊙ | 1.43 |
| | 14 | CB2 | PU4 | 42 | 35200 | 838 | 144 | ○ | ⊙ | 1.41 |
| | 15 | CB2 | PU3 | 41 | 43800 | 1068 | 140 | ○ | ⊙ | 1.40 |
| | 16 | CB2 | PU7 | 32 | 42500 | 1328 | 140 | ○ | ○ | 1.42 |
| Comparative example | 38 | CB2 | PU1 | 23 | 34100 | 1483 | 143 | ○ | X | 1.44 |

TABLE 10

| | No. | Name of carbon black | Resin added after dispersion | Acid value | Weight average molecular weight | Molecular weight/acid value | Dispersed particle diameter (nm) | Dispersibility | Stability | OD |
|---|---|---|---|---|---|---|---|---|---|---|
| Example | 17 | CB2 | StAc4 | 150 | 8800 | 59 | 143 | ○ | ⊙ | 1.41 |
| | 18 | CB2 | StAc6 | 180 | 11000 | 61 | 143 | ○ | ⊙ | 1.39 |
| | 19 | CB2 | StAc5 | 150 | 11000 | 73 | 141 | ○ | ⊙ | 1.40 |
| | 20 | CB2 | StAc2 | 120 | 11000 | 92 | 141 | ○ | ○ | 1.43 |
| | 21 | CB2 | StAc7 | 153 | 17600 | 115 | 139 | ○ | ○ | 1.39 |

TABLE 10-continued

| | No. | Name of carbon black | Resin added after dispersion | Acid value | Resin Weight average molecular weight | Molecular weight/acid value | Dispersed particle diameter (nm) | Dispersibility | Stability | OD |
|---|---|---|---|---|---|---|---|---|---|---|
| Comparative example | 39 | CB2 | StAc1 | 94 | 13400 | 143 | 144 | ○ | X | 1.44 |
| | 40 | CB2 | StAc3 | 116 | 30500 | 263 | 144 | ○ | X | 1.42 |

As a result, regarding the aqueous black pigment dispersions in Examples 1 and 2 shown in Table 6, the urethane resin or acrylic resin serving as the resin having anionic groups was added after dispersion, where the proportion of the resin was 0.5, and it is clearly shown that the dispersibility and the stability are good. Also, the OD values are 1.31 and 1.32 and, therefore, are good.

Likewise, regarding the aqueous black pigment dispersions in Examples 3 and 4, the urethane resin or acrylic resin serving as the resin having anionic groups was added after dispersion, where the proportion of the resin was 0.2, and it is clearly shown that the dispersibility and the stability are good. Also, OD values of the two are 1.35 and, therefore, are good.

However, as described above, the OD values of Examples 1 and 2, in which large amounts of resins were added, tend to decrease. Therefore, the proportion of the resin is preferably 0.5 or less.

Meanwhile, regarding the aqueous black pigment dispersions in Examples 5 to 10, the urethane resin or acrylic resin serving as the resin having anionic groups was added after dispersion, where the proportion of the resin was 0.2, and it is clearly shown that the dispersibility and the stability are good. Also, OD values are 1.21 to 1.34 and, therefore, are good.

On the other hand, regarding each of the aqueous black pigment dispersions in comparative examples 1 to 12 shown in Table 7, a resin having anionic groups was not added or the resin having anionic groups was added before dispersion, where the proportion of the resin was the same as that of Examples 3 to 10 and was 0.2. However, even when OD value is 1.2 or more, the degree of change in the viscosity is very large and the heat storage stability is poor or OD in itself does not reach 1.2.

As described above, it is clearly shown from Examples 1 to 10 and Comparative examples 1 to 12 that high OD and good storage stability can be secured by adding the resin having anionic groups after dispersion.

Then, it is clearly shown that the aqueous black pigment dispersions of Comparative examples 13 to 22 shown in Table 8 exhibit poor dispersibility, poor stability, and very low OD in spite of the fact that the urethane resin or acrylic resin serving as the resin having anionic groups is added after dispersion, where the proportion of the resin is 0.2, in the same manner as Examples 3 to 10 shown in Table 6.

Also, the aqueous blade pigment dispersions of Comparative examples 23 to 37 shown in Table 8 can not secure all the dispersibility, the stability, and good OD at the same time in spite of the fact that the resin having anionic groups is not added in the same manner as Examples 3 to 10 shown in Table 6 or the same amount of resin having anionic groups as the amount in Examples 3 to 10 is added before dispersion.

Further, the values of "amount of carboxylic acid/specific surface area" of the carbon black used in Comparative examples 13 to 37 are 0 to 0.69, whereas the values of "amount of carboxylic acid/specific surface area" of the carbon black used in Examples 3 to 10 are 0.88 to 5.30.

As described above, it is clearly shown from Examples 3 to 10 and Comparative examples 13 to 37 that the range of "amount of carboxylic acid/specific surface area" of the carbon black is about 0.8 to 5.5 ($\mu$mol/m$^2$), where good dispersibility, storage stability, and OD can be secured by adding the resin having anionic groups after dispersion.

Then, it is clearly shown that regarding the aqueous black pigment dispersions of Examples 11 to 16 shown in Table 9, Urethane resins PU2, PU3, PU4, PU5, PU6, and PU7 serving as the resins having anionic groups are added after dispersion and every dispersion exhibits good dispersibility, stability, and OD.

On the other hand, regarding the aqueous black pigment dispersion of Comparative example 38 shown in Table 9, Urethane resin PU1 serving as the resin having anionic groups is added after dispersion in the same manner as the example, and the dispersibility and OD are good although the stability is poor.

The values of "weight average molecular weight/acid value" of PU1 used in Comparative example 38 is 1.483, whereas the values of "weight average molecular weight/acid value" of PU2, PU3, PU4, PU5, PU6, and PU7 used in Examples 9 to 14 are 755 to 1,328.

As described above, as clearly shown from Examples 11 to 16 and Comparative example 38, the urethane resin that satisfies (weight average molecular weight/acid value)<1, 400 is preferable in order to secure good dispersibility, storage stability, and OD.

Also, it is clearly shown that regarding the aqueous black pigment dispersions of Examples 17 to 21 shown in Table 10, Styrene acrylic resins StAc2, StAc4, StAc5, StAc6, and StAc7 serving as the resins having anionic groups are added after dispersion and every dispersion exhibits good dispersibility, stability, and OD.

On the other hand, regarding the aqueous black pigment dispersions of Comparative examples 39 and 40 shown in Table 10, Styrene acrylic resins StAc1 and StAc3 serving as the resins having anionic groups are added after dispersion, and the dispersibility and OD are good although the stability is poor.

The values of "weight average molecular weight/acid value" of StAc1 and StAc3 used in Comparative examples 39 and 40 are 143 to 263, whereas the values of "weight average molecular weight/acid value" of StAc2, StAc4, StAc5, StAc6, and StAc7 used in Examples 15 to 19 are 59 to 115.

As described above, as clearly shown from Examples 1 to 21 and Comparative example 39 and 40, the styrene acrylic resin that satisfies (weight average molecular weight/acid value)<120 is preferable in order to secure good dispersibility, storage stability, and OD.

The invention claimed is:

1. A method for manufacturing an aqueous black pigment dispersion, comprising the steps of subjecting a mixture containing carbon black and an aqueous medium to media-less dispersion and adding a resin having anionic groups and a basic compound after the dispersion,
- wherein the carbon black has a carboxylic acid group on the surface such that the value produced by dividing the amount of carboxylic acid group present on the surface by BET value is 0.8 to 5.5 ($\mu mol/m^2$), and
- the resin having anionic groups is an urethane resin that satisfies (weight average molecular weight/acid value) <1,400 or a styrene acrylic resin that satisfies (weight average molecular weight/acid value)<120.

2. The method for manufacturing an aqueous black pigment dispersion, according to claim 1, wherein the media-less dispersion is ultrasonic dispersion, an amount of application of electric power relative to a mass of carbon black contained in the dispersion being 0.4 to 2.0 W/g.

3. A method for manufacturing an aqueous black pigment dispersion, comprising the steps of subjecting a mixture containing carbon black, an aqueous medium, and a basic compound to media-less dispersion and adding a resin having anionic groups after the media-less dispersion, the dispersed mixture being made alkaline before the addition of the resin having anionic groups to the dispersion,
- wherein the carbon black has a carboxylic acid group on the surface such that the value produced by dividing the amount of carboxylic acid group present on the surface by BET value is 0.8 to 5.5 ($\mu mol/m^2$), and
- the resin having anionic groups is an urethane resin that satisfies (weight average molecular weight/acid value) <1,400 or a styrene acrylic resin that satisfies (weight average molecular weight/acid value) <120.

4. A method of manufacturing an ink composition, comprising:
- manufacturing an aqueous black pigment dispersion by the method according to claim 1; and
- adding the aqueous solvent or water; and a binder to prepare the ink composition.

* * * * *